United States Patent Office 3,595,624
Patented July 27, 1971

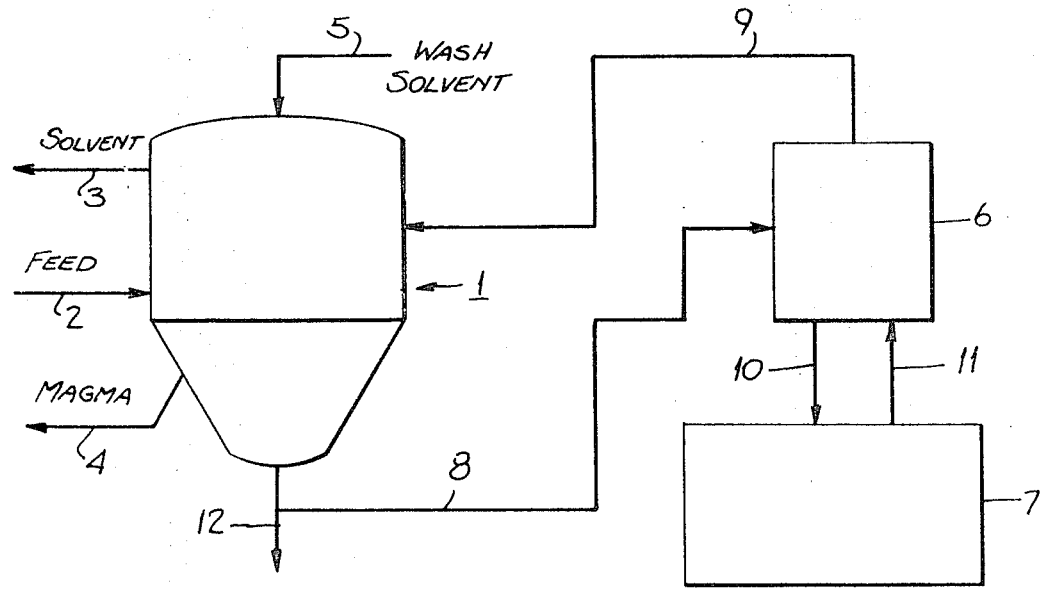
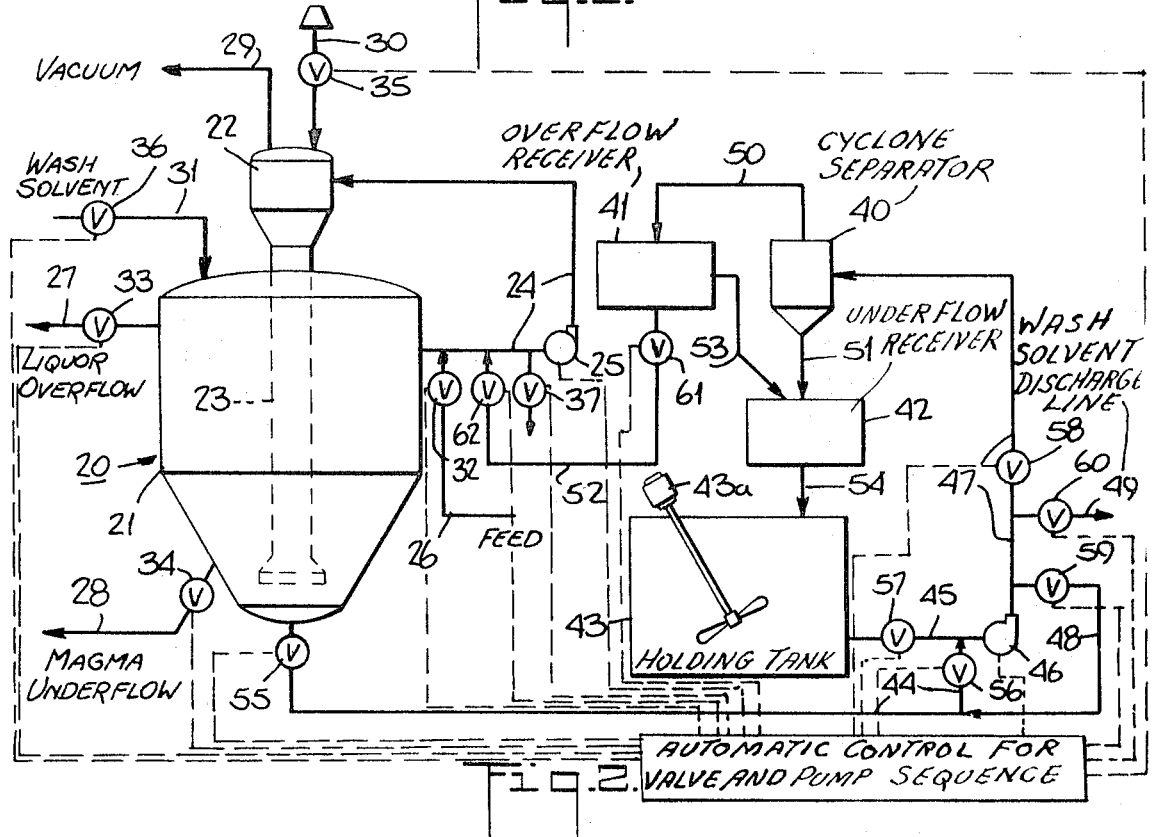

3,595,624
METHOD AND APPARATUS FOR WASHING CRYSTALLIZERS
David L. Bradfield, Westminster, Colo., Robert L. Curfman, Moab, Utah, and Richard Heine, Boulder, and Kurt W. Hitsch, Denver, Colo., assignors to Texas Gulf Sulphur Company, New York, N.Y.
Filed May 16, 1968, Ser. No. 729,708
Int. Cl. B01d 9/00
U.S. Cl. 23—273
16 Claims

ABSTRACT OF THE DISCLOSURE

A method for removing soluble deposits on crystallizer surfaces is disclosed which includes the steps of (1) simultaneously draining magma from the crystallizer, separating the solids from the liquid phase of the magma, returning the liquid to the crystallizer to maintain the liquid level, and charging the solids to a holding tank; (2) then draining the liquid remaining in the crystallizer and charging it to the holding tank; (3) next washing out the crystallizer with a suitable solvent for the soluble deposits and draining the crystallizer; (4) thereafter simultaneously draining the suspension retained in the holding tank from the tank, separating the solids from the liquid, feeding the liquid to the crystallizer and returning the solids to the holding tank; and, (5) finally returning the solids remaining in the holding tank to the bottom of the crystallizer, whereby the crystallizer's contents are substantially restored to an on-stream condition. Apparatus for carrying out this process is also described.

DISCLOSURE

This invention relates to a method and apparatus for washing out crystallization vessels. More particularly, this invention is concerned with a method and apparatus for washing soluble deposits out of continuous crystallizers. In a still more particular embodiment the present invention relates to a method and apparatus for washing out continuous circulating vacuum crystallizers.

BACKGROUND

Various methods and apparatus for effecting crystallization in a continuous manner have been developed. In all of these methods a solution is supersaturated with respect to the solute and the supersaturation is relieved by crystal formation (nucleation) and crystal growth. Supersaturation is effected in some cases by cooling the solution without appreciable evaporation of the solvent, but in most instances evaporation, with or without cooling of the solution, is employed.

Regardless of the method of achieving supersaturation, the supersaturated solution is charged to a vessel where crystals form and grow, and where the crystals ordinarily are allowed to settle to the bottom of the vessel. Sufficient agitation of the resulting slurry is maintained, however, to maintain the crystals in suspension, thus forming a solids-rich magma in the lower portion of the vessel. Although agitation can be provided by the use of stirrers and the like, it often is provided by recirculation of the supernatant mother liquor whereby the liquor is drawn off and charged to the bottom of the vessel to provide an upward current through the vessel. Crystallizers of this latter type will be referred to herein as circulating crystallizers.

During continuous operation of crystallizers, the solution is continuously fed to the crystallizer and magma is continuously withdrawn. Normally a solvent stream is also drawn off, which can be the supernatant liquid and/or vaporized solvent.

The crystals are separated from the magma by any of several known techniques. The mother liquor (from the magma and the supernatant liquid) can be discarded or recycled. When two or more crystallizers are employed in series, the supernatant liquid, or overflow, and the magma, or underflow, may be fed to the other crystallizer(s) or may be withdrawn.

During crystallization, crystals form or deposit on the surfaces of the crystallizer vessel, and it is necessary to periodically remove these deposits. It is an object of this invention to provide a method for removing these deposits.

It is a further object of this invention to provide a method for washing out a crystallizer vessel with a minimum of lost time.

Still another object of this invention is to provide a method for washing out a crystallizer whereby, after completion of the wash-out procedure, the crystallizer is rapidly returned to operation.

SUMMARY OF THE INVENTION

These and other objects, which will be apparent from the following specification, attached drawings and appended claims, are achieved by:

(1) Removing the bulk of the crystals from the crystallization vessel while leaving the bulk of the liquor in the vessel;
(2) Removing the liquor and storing combined crystals and liquor in a storage vessel;
(3) Washing out the crystallizer vessel;
(4) Returning the stored liquor to the crystallizer vessel; and,
(5) Returning the stored crystals to the crystallizer vessel, whereby the contents of the crystallizer vessel are restored to substantially the same composition and temperature as prior to the wash-out procedure.

DESCRIPTION OF THE DRAWINGS

To facilitate an understanding of the invention, reference is made to the drawings, of which:

FIG. 1 is a schematic drawing of apparatus suitable for use in accordance with the present invention; and
FIG. 2 is a drawing of a specific embodiment employed in conjunction with a continuous, circulating, vacuum crystallizer.

With reference to FIG. 1, crystallizer 1 is equipped with feed line 2, solvent withdrawal line 3, magma withdrawal line 4, and wash-solvent line 5. Crystallizer 1 is also provided with a wash-out circuit comprising solids-liquid separator 6, storage vessel 7 equipped with means to maintain a uniform suspension, such as stirrers and the like, crystallizer drain line 8, liquid return line 9, storage vessel feed line 10, storage vessel discharge line 11 and wash-solvent discharge line 12.

When crystallizer 1 is on stream, the wash-out circuit is sealed off by valves in lines 8 and 9. Feed solution is continuously fed to crystallizer 1 through feed line 2, solvent is continuously withdrawn as supernatant liquor and/or vapor through line 3 and magma is continuously withdrawn through line 4.

To effect the wash-out procedure of this invention, the feed to crystallizer 1 is cut off and lines 2, 3 and 4 are closed. Then the magma in the bottom of crystallizer 1 is withdrawn through line 8 and fed into solids-liquid separator 6. The solids-liquid separator can be any suitable device, such as a filter, centrifuge, screen, cyclone and the like. Cyclones are preferred because of the speed with which they can effect the separation. Liquor separated from the magma in separator 6 is returned to crystallizer 1 through line 9. Crystals recovered in separator 6 are charged through line 10 to storage vessel 7. During this phase, agitation of the contents of crystallizer 1 is continued to prevent the settling of suspended crystals on crystallizer surfaces. This step is continued until the solids content of the slurry in crystallizer 1 is reduced to a level such that the danger of settling on termination of agitation is minimized.

In the second step of the method of this invention the remaining contents of crystallizer 1 are drained to storage tank 7 and retained in tank 7 under sufficient agitation to prevent settling. In addition, storage tank 7 may be provided with insulation and heating or cooling means to maintain the slurry at about the temperature of the crystallizer when it is on stream.

Once the crystallizer is drained, it is filled with wash solvent through line 5 and, after the crystal deposits have dissolved in the solvent, the solvent is drained through line 8 and then discharged through line 12.

After crystallizer 1 has been washed out, the contents of storage vessel 7 are removed through line 11 and fed to separator 6. Solids are returned to storage vessel 7 and the liquid phase is charged to crystallizer 1 through line 9. Next, the solids remaining in storage tank 7 are returned to crystallizer 1, preferably to the bottom of crystallizer 1, whereby the crystallizer contents are substantially restored to their on-stream condition. Finally, the wash-out circuit is closed off and the crystallizer is returned to operation.

PREFERRED EMBODIMENT

The method of the present invention is of particular utility with circulating crystallizers. A specific embodiment is illustrated in FIG. 2 in conjunction with a vacuum crystallizer.

In this embodiment, crystallizer 20, comprising body 21, vapor head 22 and liquid leg 23, is equipped with circulation line 24 in which is located circulation pump 25. Crystallizer 20 is also provided with solution feed line 26, which discharges into circulation line 24, liquor overflow line 27, magma underflow line 28, vacuum line 29, vent line 30 and wash-solvent line 31. Valving includes feed line valve 32, overflow line valve 33, underflow line valve 34, vent line valve 35, wash-solvent line valve 36, and circulating line drain valve 37.

The wash-out circuit comprises cyclone 40, cyclone overflow receiver 41, cyclone underflow receiver 42, holding tank 43 equipped with agitator 43a and means to maintain the temperature of the contents as that of the crystallizer, not shown, crystallizer drain line 44, holding tank drain line 45, wash-out pump 46, wash-out pump discharge and cyclone feed line 47, wash-out pump discharge by-pass line 48, wash-solvent discharge line 49, cyclone overflow line 50, cyclone underflow line 51, cyclone overflow recycle line 52, cyclone overflow return line 53, and holding tank feed line 54. Valving includes drain line valves 55 and 56 located adjacent crystallizer 20 and pump 46, respectively, tank drain valve 57, cyclone feed valve 58, by-pass valve 59, discharge valve 60, and cyclone overflow recycle line valves 61 and 62 located adjacent cyclone overflow receiver 41 and crystallizer recycle line 24, respectively.

When crystallizer 20 is on stream, valves 32, 33 and 34 are open. Feed solution is continuously fed through line 26 into circulation line 24 and mixed with circulating liquor. The mixture is fed by pump 25 to vapor head 22, which is maintained at reduced pressure by pulling a vacuum through line 29 and maintaining valve 35 in vent line 30 closed. A portion of the solvent evaporates in head 22 and is withdrawn through line 29. The resulting supersaturated liquor passes down through leg 23 to the bottom of crystallizer body 21 and discharges into the body where it contacts the magma in the lower portion of body 21. Supersaturation is relieved by the formation of new crystals and by an increase in the size of existing crystals. The liquor flows upward through the magma, thereby maintaining the suspension, and out through circulation line 24. Magma is withdrawn through underflow line 28 and the liquid level is maintained by continuously withdrawing liquor through overflow line 27.

During steady state operation, valves 36, 37, 55, 56, 58, 60, 61 and 62 are closed and valves 57 and 59 are open and wash-out pump 46 is off.

When it is desired to wash-out crystallizer 20, the crystallizer is isolated by closing valves 32, 33 and 34 in solution feed line 26, liquor overflow line 27 and magma underflow line 28, respectively.

Next the bulk of the solids are removed from crystallizer body 21 by, in sequence, opening valves 62, 61 and 58, closing valve 59, opening valve 55, opening valve 56 and simultaneously closing valve 57 and satrting wash-out and simultaneously closing valve 57 and sartting wash-out pump 46. As a result, magma is withdrawn from crystal-pump 46 to cyclone 40. Cyclone 40 separates liquor from solids, and the solids are discharged through underflow line 51 to underflow receiver 42 and then through line 54 to holding tank 43. The cyclone overflow passes through line 50 to overflow receiver 41, and then through line 52 to circulating line 24. Circulation is maintained in crystallizer 20 to prevent settling of the crystals during draining. During this step vent valve 35 is partially opened to reduce the vacuum in vapor head 22 as the density of the suspension decreases and thus to maintain the liquid level in crystallizer 20.

When the solids density in crystallizer body 21 has decreased sufficiently to avoid danger of settling, valve 61 is closed and valve 35 is opened to vent crystallizer 20 to atmospheric pressure. Circulating pump 25 may also be turned off. As a result of the closing of valve 61, the liquid level in receiver 41 increases until the cyclone overflow passes out through return line 53 to underflow receiver 42, and then through line 54 to tank 43. When crystallizer body 21 has been completely drained and tank 43 contains the crystallizer contents in substantially the same condition of temperature and the average solids density as in crystallizer 20, pump 46 is shut off.

At this time valves 55 and 58 are closed, valve 36 is opened and valve 35 is partially closed to fill crystallizer body 21 and vapor head 22 with wash solvent and circulating pump 25 is turned on. When crystallizer 20 is filled with wash solvent, valve 36 is closed and the wash solvent is circulated through circulation line 24, vapor head 22, leg 23 and body 21 to dissolve all soluble deposits. Desirably the progress of the washing is followed by periodic analysis of the circulating solvent. For example, the specific gravity of the solvent can be monitored, and when the specific gravity becomes stable below the saturation density the deposits have been dissolved.

The crystallizer is now drained by, in sequence, opening valve 60 and valve 55, starting pump 46, opening valve 37 and opening vent valve 35, whereby the wash solvent and dissolved deposits are discharged through lines 44, 45, 47 and 49. Circulating pump 25 can be turned off during the draining step.

Once the crystallizer 20 and circulating line 24 have drained, crystallizer 20 is refilled. In the first stage of the refill procedure, valves 55 and 37 are closed and valve 35 is partially closed to permit the formation of a partial vacuum in crystallizer 20. Then valve 61 is opened, valve 58 is opened, valve 60 is closed, valve 57 is opened, valve 56 is closed and pump 46 is started. As a result, slurry is withdrawn from tank 43 through line 45 and pumped by pump 46 through line 47 to cyclone 40. Solids are returned from cyclone 40 through line 51, receiver 42 and line 54 to tank 43. Liquor passes from cyclone 40 through line 50, receiver 41 and line 52 to circulating line 24 and thence to crystallizer 20. As crystallizer 20 begins to fill, valve 35 is closed to attain normal operating vacuum.

When the desired liquid level has been attained in crystallizer 20, circulating pump 25 is started and circulation through crystallizer 20 is initiated to prevent settling upon introduction of the solids retained in tank 43. Then valves 55 and 59 are opened and valves 58, 61 and 62 are closed, whereby the solids retained in tank 43 pass through line 45, pump 46, line 47, line 48 and line 44 to the bottom of crystallizer body 21.

When storage tank 43 is empty, pump 46 is turned off and valve 55 is closed. Then crystallizer 20 is put back on stream by opening valves 33, 34 and 32.

The operation of the various valves and pumps can be effected manually, if desired, but as a practical matter the use of automatic controls responsive to a computer program is required. Controls of this nature are well known, and are exemptified by the "Card-O-Timer" manufactured by Taylor Instrument Co.

The process and apparatus of the present invention are applicable to a variety of crystallizations. In most instances water will be employed as the solvent and the wash-solvent. Typical materials which are recovered by crystallization from aqueous media include potassium chloride, sodium carbonate, sodium sesquicarbonate, ammonium sulfate, ammonium nitrate, urea, copper sulfate and the like.

It will be appreciated by those of ordinary skill in the art that the timing of certain of the steps of the method of this invention is not capable of precise definition, and will depend upon the particular system (solids and liquids) employed. In particular, the particular times at which steps 2 and 5 are initiated can vary.

The timing of step 2, in which liquor and any remaining solids are drained from the crystallizer prior to washing the crystallizer, depends upon the settling rate of the crystals and the type of agitation employed. In general, this step is delayed at least until there is little or no danger of solids settling on cessation of agitation. Similarly, step 5, in which solids are returned to the crystallizer, is delayed until there is sufficient liquor in the crystallizer to permit suspension of the crystals. The optimum time for the institution of steps 2 and 5 can be readily determined by a few simple experiments.

It will also be appreciated that the efficiency of the solids-liquids separation in steps 1 and 4 can vary from essentially complete separation to little separation. The achievement of high degrees of separation is generally unnecessary and uneconomical, whereas low degrees of separation are too time consuming. For each system, however, there is an optimum rate which is readily determined experimentally.

What is claimed is:

1. In a method for continuously crystallizing solids from a solution thereof wherein there is maintained a supernatant liquor phase and a solid rich magma phase, the improvement of periodically cleaning the crystallizer vessel by the steps of:
   (1) simultaneously removing the solid-rich magma phase from said vessel, separating the soilds from the liquor, of said magma phase, charging the solids to a storage vessel equipped with means to maintain a uniform suspension therein, and recycling said liquor to said crystallizer vessel;
   (2) withdrawing liquor and any remaining solids from said crystallizer vessel and charging said liquor and solids to said storage vessel;
   (3) charging said crystallizer vessel with wash solvent to dissolve deposits on the surfaces of said crystallizer vessel; and thereafter withdrawing said solvent and dissolved deposits from said crystallizer vessel;
   (4) simultaneously withdrawing the mixture of liquor and solids from said storage vessel; separating said liquor and solids; charging said liquor to said crystallizer vessel and recycling said solids to said storage vessel; and
   (5) withdrawing the remaining contents from said storage vessel and charging them to said crystallizer.

2. A method according to claim 1 wherein said separation of solids from liquor is effected in a cyclone.

3. A method according to claim 1 wherein settling of said magma in said crystallizer vessel is prevented by circulation of supernatant liquor and wherein:
   (a) circulation of said liquor is maintained during withdrawal of the solid-rich magma phase at least until the danger of solids settling in the crystallizer is minimized; and
   (b) solids are not returned to said crystallizer vessel at least until sufficient liquor has been returned thereto to permit circulation of liquor to prevent settling.

4. A method according to claim 3 wherein said separation of solids from liquor is effected in a cyclone.

5. A method according to claim 3 wherein said steps are initiated in response to an automatic controller.

6. A method according to claim 3 wherein said solution is an aqueous solution and said solvent is water.

7. A method according to claim 6 wherein said crystallized solid is an alkali metal halide or carbonate.

8. A method according to claim 7 wherein said crystallized solid is potassium chloride.

9. A method according to claim 7 wherein said crystallized solid is sodium carbonate.

10. A method according to claim 7 wherein said crystallized solid is sodium sesquicarbonate.

11. In a crystallizer vessel adapted to maintain a solid-rich magma phase and a supernatant liquor phase, the improvement comprising in combination:
   (1) means for separating solids from a mixture of liquid and solid;
   (2) a storage vessel equipped with means to maintain a uniform suspension of solid in liquid therein;
   (3) means for removing the contents of said crystallizer vessel through the bottom thereof and conveying them to said separator;
   (4) means for conveying a solid-rich fraction from said separator to said storage vessel;
   (5) means for conveying a liquor-rich fraction from said separator to said crystallizer vessel;
   (6) means for conveying a liquor-rich fraction from said separator to said storage vessel;
   (7) valving means for selecting between said liquor-rich conveying means;
   (8) means for removing the contents of said storage vessel and conveying said contents to said separator;
   (9) means for removing the contents of said storage vessel and conveying said contents to the bottom of said crystallizer vessel; and
   (10) valving means for selecting between said storage vessel contents conveying means.

12. Apparatus according to claim 11 wherein said solids-liquid separator is a cyclone.

13. Apparatus according to claim 11 wherein said crystallizer vessel includes means for withdrawing said supernatant liquor from said crystallizer vessel and means for circulating said liquor to the bottom of said crystallizer vessel and feeding said liquor into the solid-rich magma phase contained therein, and wherein said means for conveying said liquor-rich fraction from said separator to said crystallizer vessel discharges said fraction into said circulation means.

14. Apparatus according to claim 13 wherein said solids-liquor separator is a cyclone.

15. In a crystallizer vessel adapted to continuously receive a solution containing a crystallizable solute, maintain a solid-rich magma phase and a supernatant liquor phase in the body of said vessel, continuously discharge a stream of said liquor phase and a stream of said magma phase, and continuously withdraw a portion of said liquor phase through a circulating line and return said liquor to the bottom portion of said crystallizer vessel containing said magma phase, the improvement of, in combination:
   (1) a solid-liquid separator having liquid discharge means and solid discharge means;

(2) a storage vessel;
(3) a first line communicating between the bottom of said crystallizer vessel and said solid-liquid separator, said first line including a valve to seal said first line from said crystallized vessel;
(4) a second line communicating between said solids discharge means of said solid-liquid separator and said storage vessel;
(5) a third line communicating between said liquid discharge means of said solid-liquid separator and said circulating line of said crystallizer vessel, said third line including a valve to seal said third line from sad crystallizer vessel circulating line;
(6) a fourth line communicating between said liquid discharge means of said solids-liquid separator and said storage vessel;
(7) a valve at the juncture of said liquid discharge means and said third and fourth lines to select between said third and fourth lines;
(8) a fifth line communicating between the bottom of said storage vessel and said first line at a point intermediate said crystallizer vessel and said solid-liquid separator, including a valve to seal said fifth line from said storage vessel;
(9) valving to direct the flow of the contents of said fifth line toward said solid-liquid separator or said crystallizer vessel through said first line; and
(10) automatic control means for adjusting said valves and valving according to a predetermined sequence whereby the contents of said crystallizer vessel are transferred to said storage vessel and thereafter returned to said crystallizer vessel in substantially their original condition.

16. Apparatus according to claim 15 wherein said solids-liquid separator is a cyclone.

References Cited
UNITED STATES PATENTS

| | | | |
|---|---|---|---|
| 2,602,023 | 7/1952 | Simms | 23—273 |
| 2,801,907 | 8/1957 | Scott | 23—273 |
| 3,230,050 | 1/1966 | Patterson et al. | 23—273 |

OTHER REFERENCES

Industrial and Engineering Chemistry, August 1961.

NORMAN YUDKOFF, Primary Examiner

S. SILVERBERG, Assistant Examiner

U.S. Cl. X.R.

134—22; 159—45

UNITED STATES PATENT OFFICE
CERTIFICATE OF CORRECTION

Patent No. 3,595,624　　　　　　　Dated July 27, 1971

Inventor(s) David Bradfield, Robert L. Curfman, Richard Heine, and Kurt W. Hitsch It is certified that error appears in the above-identified patent and that said Letters Patent are hereby corrected as shown below:

Column 3, line 47, "as" should be -- at -- ;

Column 4, line 15, correct the spelling of -- starting -- ;

Column 4, line 16, repeats line 15 and should be omitted;

Column 4, line 18, after "crystal-" insert -- lizer body 21 through lines 44 and 45 and pumped by --;

Column 4, line 41, cancel "the" ;

Column 7, line 13, correct the spelling of -- said --.

Signed and sealed this 4th day of January 1972.

(SEAL)
Attest:

EDWARD M.FLETCHER,JR.　　　　　　ROBERT GOTTSCHALK
Attesting Officer　　　　　　　　Acting Commissioner of Patents